US005602805A

United States Patent [19]

Chigita

[11] Patent Number: 5,602,805
[45] Date of Patent: Feb. 11, 1997

[54] DISK DRIVE APPARATUS AND METHOD INCLUDING POWER BACKUP

[75] Inventor: Kazuhiro Chigita, Yokohama, Japan

[73] Assignee: Ricoh Company, Ltd., Tokyo, Japan

[21] Appl. No.: 372,666

[22] Filed: Jan. 13, 1995

[30] Foreign Application Priority Data

Jan. 20, 1994 [JP] Japan .................................... 6-018815

[51] Int. Cl.$^6$ ........................................................ G11B 5/09
[52] U.S. Cl. ............................... 369/13; 369/243; 369/53
[58] Field of Search ............................. 369/53, 13, 243, 369/235; 360/69; 365/228, 229

[56] References Cited

U.S. PATENT DOCUMENTS

| | | | |
|---|---|---|---|
| 5,048,004 | 9/1991 | Deguchi | 369/58 |
| 5,313,612 | 5/1994 | Satoh | 365/228 |

FOREIGN PATENT DOCUMENTS

| | | | |
|---|---|---|---|
| 57-82216 | 5/1982 | Japan | G11B 5/09 |
| 60-201579 | 10/1985 | Japan | G11B 21/02 |
| 63-311677 | 12/1988 | Japan | G11B 21/12 |
| 3-48576 | 7/1991 | Japan | G11B 7/085 |

OTHER PUBLICATIONS

English Language Abstract of Japanese Laid–Open Application No. 57–82216.
English Language Abstract of Japanese Laid–Open Application No. 60–201579.
English Language Abstract of Japanese Laid–Open Application No. 63–311677.

Primary Examiner—David C. Nelms
Assistant Examiner—Son Mai
Attorney, Agent, or Firm—Cooper & Dunham LLP

[57] ABSTRACT

The magneto-optical disk drive apparatus according to the present invention sends a notice for inhibition of writing write data into a magneto-optical disk to a host computer when a volume of electric charge in a secondary battery has not reached a predetermined level, so that, even when power supply from outside is disconnected, write data already stored in a write buffer can safely and accurately be written into a magneto-optical disk.

12 Claims, 9 Drawing Sheets

DISK DRIVE APPARATUS AND METHOD INCLUDING POWER BACKUP

FIELD OF THE INVENTION

The present invention relates to a countermeasure against power failure in a magneto-optical disk drive apparatus and driving method thereof, and more particularly to a magneto-optical disk drive apparatus and driving method thereof which insures improved reliability by improving the data write state by means of making it possible to write data stored in a write buffer into a magneto-optical disk using a secondary battery when an external power supply is disconnected.

BACKGROUND OF THE INVENTION

As a countermeasure against power failure in a magneto-optical disk drive apparatus, there has been known firstly a method of writing data before occurrence of power failure in a non-volatile memory during magnetic recording and writing data from this non-volatile memory into a specified memory when power supply is restored (Refer to, for instance, Japanese Patent Publication No. 2202/1990).

However, in this first method, a non-volatile memory is required, and when a capacity of a buffer memory is large, it is required to use a non-volatile memory having the same capacity, the cost becomes expensive, and in addition it is necessary to provide a non-volatile memory in the data recording device, so that the method can not always be applied to all types of data recording devices based on the conventional technology.

Secondly, there has been known a method of executing carriage unload from a home position to a lock position at a specified reference speed when power is turned OFF (Refer to, for instance, Japanese Patent Laid Open Publication No. 311677/1988).

This second method is for unloading a carriage upon power turn OFF, so that protection of write data during power failure is impossible.

Thirdly, a method of tracking in a sector which recording was made finally during recording operation down has been known (Refer to, for instance, Japanese Patent Publication No. 48576/1991).

In this third method, only a beam position is returned to a relative position of a beam to a disk, so that protection of write data during power failure is also impossible like in the second method.

Fourthly, there is a method of automatically locking an optical head to a given position when power supply is turned OFF (Refer to, for instance, Japanese Patent Laid Open Publication No. 201579/1985).

Also in this fourth method, only a beam position is fixed at a relative position of a beam to a disk when power failure occurs, so that protection of write data during power failure is impossible like in the second method.

As described above, in the conventional types of magneto-optical disk drive apparatus as described above, various types of countermeasure have been proposed against power failure, but any countermeasure is not effective for write data protection.

For this reason, disadvantageously there has been no magneto-optical disk drive apparatus which makes it possible to write write data safely and accurately in a storage medium during power failure.

SUMMARY OF THE INVENTION

It is an object of the present invention to provide a magneto-optical disk drive apparatus and driving method thereof which makes it possible to safely write write data in a write buffer in a storage medium without using a non-volatile memory as a write buffer when external power supply is disconnected.

In more details, if an external power supply is disconnected during writing write data, sometimes sectors in deleted state may remain on a magneto-optical disk, and in some types of operating system such as DOS, if sectors in deleted sectors remain on a magneto-optical disk, sometimes access to the magneto-optical disk as a file system may be disabled.

This type of phenomenon is caused because such an operating system as DOS has been developed for magnetic disks and assumes that any sector in a deleted state does not exist on the disk.

As well known, in case of DOS, when data write is executed, data on a disk is once read out and superimposed as the write data in a buffer of a host computer, and then written back onto the disk, but if an error occurs in the first reading step of this operation due to presence of any sector in a deleted state as described above, DOS is hanged up.

Also, if the deleted sector is data in a file construction section of DOS, also hanging up occurs when file construction check is executed according to the DISK CHECK command (CHKDSK command).

To evade this type of trouble, in the present invention, when external power supply is disconnected, write data in a write buffer can be written into a storage medium without fail.

Secondly, when external power supply is OFF, if a secondary battery is used, in association with increase of electric charge stored in the secondary battery, time when a magnetic-optical disk drive can run on power from the secondary battery becomes longer.

On the other hand, in association with increase of a volume of write data received by a write buffer from a host computer, also the time required for writing write data into a write buffer on power from the secondary data after power supply is disconnected becomes longer.

In this case, by inhibiting write operation until an electric charge in the secondary battery reaches a predetermined level, even if a write buffer is saturated with write data, write operation on power from the secondary battery is insured, but on the contrary, receiving of write data can not be started, which is disadvantageous.

Furthermore, if an electric charge which can be stored in a secondary battery decreases due to historical change or for other reasons, it becomes impossible to receive write data, so that a service life of the secondary battery which can actually be used is limited.

Thirdly, if a supply current required when operating on power from a secondary battery is large, hardware required to supply power from the secondary battery becomes disadvantageously expensive.

Fourthly, when rotational speed of a spindle motor becomes slower in case of power failure, stop of rotation is only waited, and during this period power is uselessly wasted by a controller.

Fifthly, there are dispersion in product quality among a plurality of cells, and if a cell already out of its service life is used for power supply, power from a cell still available is used in waste by the cell out of its service life, and sometimes power is not supplied effectively.

Sixthly, even in a case where an electric charge in the secondary battery is smaller than the rated full charge in the initial stage of its use, it is necessary to write write data into a magneto-optical disk safely, and this problem has not been solved by the conventional technology.

In the present invention, firstly, in a magneto-optical disk drive comprising a secondary battery comprising a plurality of cells each supplying power to be supplied to the magneto-optical disk drive from outside, an electric charge detector for detecting an electric charge stored in the secondary battery, a write buffer for storing therein write data from a host computer, a current switch for switching so that a current from the magneto-optical disk drive is supplied from the secondary battery when power supply is disconnected, a spindle motor for rotating a magneto-optical disk, and a controller for controlling the magneto-optical disk drive, said magneto-optical disk drive having the function to read/write data from and to the magneto-optical disk, when an electric charge stored in the secondary battery is less than a predetermined level, writing write data into the magneto-optical disk is inhibited.

Secondly, the first magneto-optical disk drive described above has a write data volume controller for limiting a volume of write data to be stored in the write buffer according to an electric charge stored in the secondary battery.

Thirdly, the first magneto-optical disk drive described above has a rotational speed controller for maintaining a rotational speed of a spindle motor at a predetermined rotational speed, when external power supply is stopped and power supply to the magneto-optical disk drive is switched to the secondary battery, by stopping power supply to the spindle motor once and lowering the rotational speed of the spindle motor to a predetermined level, and writes write data stored in the write buffer into the magneto-optical disk when the rotational speed of the spindle motor is kept at the predetermined level.

Fourthly, the third magneto-optical disk drive described above has a first clock switch for switching an operating clock of for a magneto-optical disk drive controller from a normal clock to a slower clock when power supply to the spindle motor is once stopped, and a second clock switch for switching an operating clock of the controller to the normal clock when the rotational speed of the spindle motor is lowered to and is kept at a predetermined rotational speed.

Fifthly, the first magneto-optical disk drive has an unit for supplying power to a magneto-optical disk drive by selecting a cell in which an electric charge has reached a prespecified electric charge level with an electric charge level detector for detecting a volume of electric charge in each cell in the secondary battery comprising a plurality of cells.

Sixthly, the first magneto-optical disk drive has a rotational speed controller for maintaining a rotational speed of a spindle motor at a predetermined rotational speed, when external power supply is stopped and power supply to the magneto-optical disk drive is switched to the secondary battery, by stopping power supply to the spindle motor once and lowering the rotational speed of the spindle motor to a predetermined rotational speed according to a volume of electric charge stored in the secondary battery, and writes write data stored in a write buffer into the magneto-optical disk when the rotational speed of the spindle motor is kept at a predetermined level.

In the magneto-optical disk drive which, when external power supply is disconnected, switches power supply to a secondary battery to continue its operation, determination as to whether write data received into a write buffer from a host computer can be written into an magneto-optical disk or not is made according to a volume of electric charge actually stored in the secondary battery, and data write into a magneto-optical disk is executed only when it is possible.

Concretely, data write is inhibited until a volume stored in the secondary battery reaches a predetermined level.

Then, a volume of data which can be written in is computed according to a volume of electric charge in a secondary battery, and only the volume of data is received from a host computer into a write buffer, and when external power supply is disconnected, power supply from the secondary battery is stopped for saving power while power supply to the spindle motor is once stopped and drop of the rotational speed to a specified value is waited.

Thirdly, when external power supply is disconnected, if power supply to a spindle motor is once stopped and drop of the rotational speed to a specified value is waited, a clock of a controller is switched to a clock slower than that in the normal operating mode to reduce power consumption in the secondary battery.

Fourthly, there is dispersion in product quality among a plurality of cells, and if a cell already out of its service life is used for power supply, power from a cell still available is consumed in waste by the cell already out of its service life, and power can not be supplied effectively, so that determination to availability of each cell is executed according to a volume of electric charge in each cell, and a cell already out of its service life is not used.

Finally, even when a volume of electric charge in the secondary battery is smaller than a volume of full charge in the initial stage of its use, an allowable rotational speed of a spindle motor is obtained from a volume of electric charge, the spindle motor is driven according to the rotational speed, and data write to a magneto-optical disk is executed in safety.

Other objects and features of this invention will become understood from the following description with reference to the accompanying drawings.

DESCRIPTION OF THE PREFERRED EMBODIMENTS

Next detailed description is made hereinafter for embodiments of a magneto-optical disk drive according to the present invention with reference to the related drawings.

In the embodiment, in a magneto-optical disk drive in which a secondary battery is available in preparation for a case where external power supply is disconnected, when a volume of electric charge in a secondary battery has not reached a predetermined volume of electric charge therein, writing new write data from a host computer into a magneto-optical disk is inhibited, so that write data already stored in the write buffer can safely be written into an magnetooptical disk.

Figure 1:
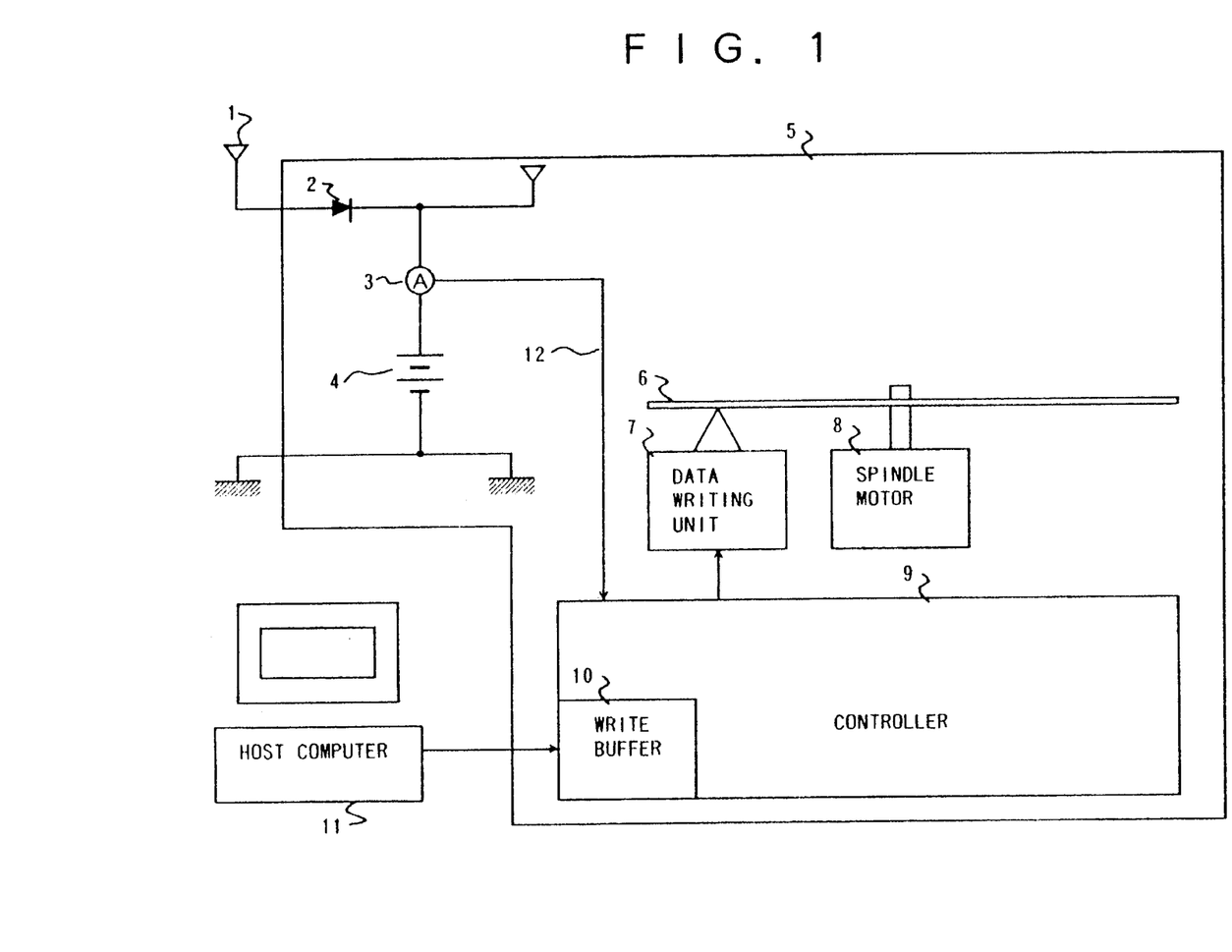
FIG. 1 is a functional block diagram showing an embodiment of the key configuration of a magnetooptical disk drive according to the present invention.

FIG. 1 is a functional block diagram illustrating an embodiment of the key configuration of the magneto-optical disk drive according to the present invention. In this figure, designated at the reference numeral 1 is an external power supply unit, at 2 a current switch, at 3 an electric charge volume detector, at 4 a secondary battery, at 5 a magneto-optical disk drive, at 6 an magneto-optical disk, at 7 a data writing unit, at 8 a spindle motor, at 9 a controller, at 10 a write buffer, at 11 a host computer, at 12 an electric charge volume delivery line.

As shown in FIG. 1, the magneto-optical disk drive according to the present invention comprises a magneto-optical disk drive 5, a secondary battery 4 comprising a plurality of cells each supplying power to be supplied to the magneto-optical disk drive 5 from outside, an electric charge volume detector 3 for detecting a volume of electric charge stored in the secondary battery 4, a write buffer 10 for storing therein write data from a host computer 11, a current switch 2 for switching, when external power supply is stopped, a current to the magneto-optical disk drive 5 to that from the secondary battery 4, a spindle motor 8 for rotating the magneto-optical disk 6, and a controller 9 for controlling the magneto-optical disk drive 5, and having a function to read out from or write data into the magneto-optical disk 6.

The operations are as follows. When power supply from the external power supply unit 1 to the magneto-optical disk drive 5 is started, simultaneously charging to the secondary battery 4 is started from the external power supply unit 1, and power is stored therein.

A volume of electric charge stored in the secondary battery 4 is detected by the electric charge volume detector 3, and information concerning the detected volume of electric charge is delivered by the electric charge volume delivering line 12 to the controller 9.

When a write command instruction, namely a write command to the magneto-optical disk 6 outputted from the host computer 11 is received, the controller 9 checks whether a volume of electric charge stored in the secondary battery 4 has reached a predetermined level or not, and if the volume has not reached the predetermined level, the controller 9 issues a notice inhibiting writing write data into the magneto-optical disk 6 to the host computer 11.

In this step, as a method of delivering the notice, for instance, such a means as a write protect error, or a drive-not-ready error in an SCSI device is used.

As described above, in this first embodiment, when a write instruction (a write command) to the magneto-optical disk 6 is received from the host computer 11, the controller 9 checks whether a volume of electric charge stored in the secondary battery 4 has reached a predetermined level or not, and if the volume has not reached the predetermined level, a notice inhibiting data write into the magneto-optical disk 6 is delivered to the host computer 11.

For this reason, even when power supply from an external power supply unit is stopped, write data stored in the write buffer can safely and accurately be written into the magneto-optical disk 6.

Figure 2:
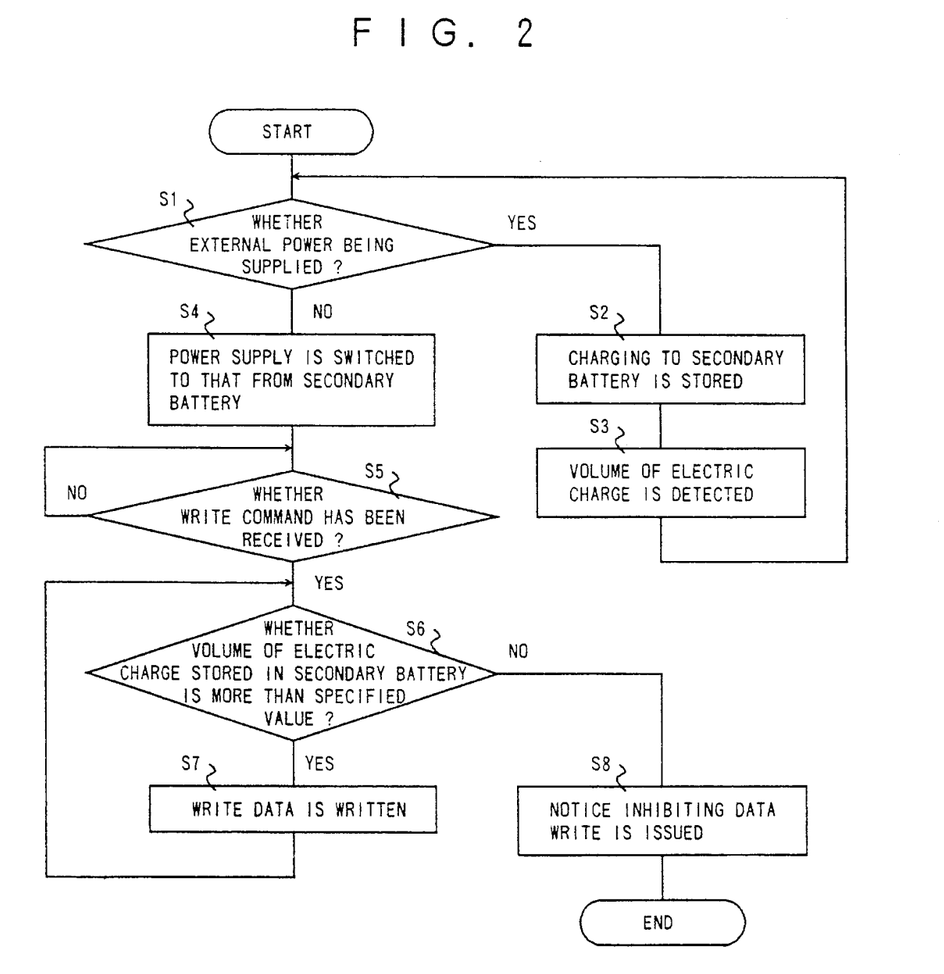
FIG. 2 is a flow chart showing a flow of main operations of the controller in the magneto optical disk drive according to the present invention.

The above operations are shown below as a flow. FIG. 2 is a flow chart illustrating a flow of main operations by the controller 9 in the magneto optical disk drive according to the present invention. In this figure, each of S1 to S8 shows a step.

In step S1, whether external power is being supplied or not is checked. If external power is being supplied, system control advances to step S2, and charging to the secondary battery is started, and in the next step S3, a volume of electric charge is detected. If external power is not being supplied (during power OFF), system control advances to step S4, and power supply is switched to that from the secondary battery.

In the next step S5, whether a write command has been received or not is checked.

When a write command is received, system control advances to step S6, and whether a volume of electric charge stored in the secondary battery is more than a specified value or not is checked.

If the volume is more than a specified value, in step S7, write data in the write buffer is written into the magneto-optical disk.

Also when the volume of electric charge stored in the secondary battery is less than the specified value, system control advances to step S8, and a notice inhibiting data write is issued to the host computer.

By means of operations in steps S1 to S8, when external power is disconnected, write data in the write buffer can safely and accurately be written into a magneto-optical disk depending on power charged by the secondary battery.

Next description is made for a second embodiment of the present invention.

Also the hardware configuration is the same as that in the first embodiment shown in FIG. 1.

In the first embodiment described above, when external power supply is disconnected, whether a volume of electric charge stored in a secondary battery is more than a specified value or not is checked, and if the volume is less than a specified value, writing new write data from a host computer is inhibited, but this second embodiment is characterized in that, if the volume of electric charge stored in the secondary battery is more than a specified value, new write data is received from the host computer according to the volume of electric charge.

Operations in the second embodiment are as follows.

When the magneto-optical disk drive 5 receives a write command from the host computer 11, the controller 9 computes a volume of data which can be written in the magneto-optical disk 6 only with power from the secondary battery according to a volume of electric charge stored in the secondary battery 4 at a point of time when detected by the electric charge volume detector 3, and receives the volume of write data from the host computer 11.

Then, when all the write data once received has been written in the magneto-optical disk 6, if there still remains any continuous write data to be written in the magneto-optical disk 6, the controller 9 receives the write data from the host computer 11.

The controller 9 divides write data into several groups each possible to be written depending upon a charge volume stored in the secondary battery 4 and repeats the cycle of receiving write data from the host computer 11 in which write data is received and written according to a volume of electric charge stored in the secondary battery 4, until all write data has been written.

Figure 3:
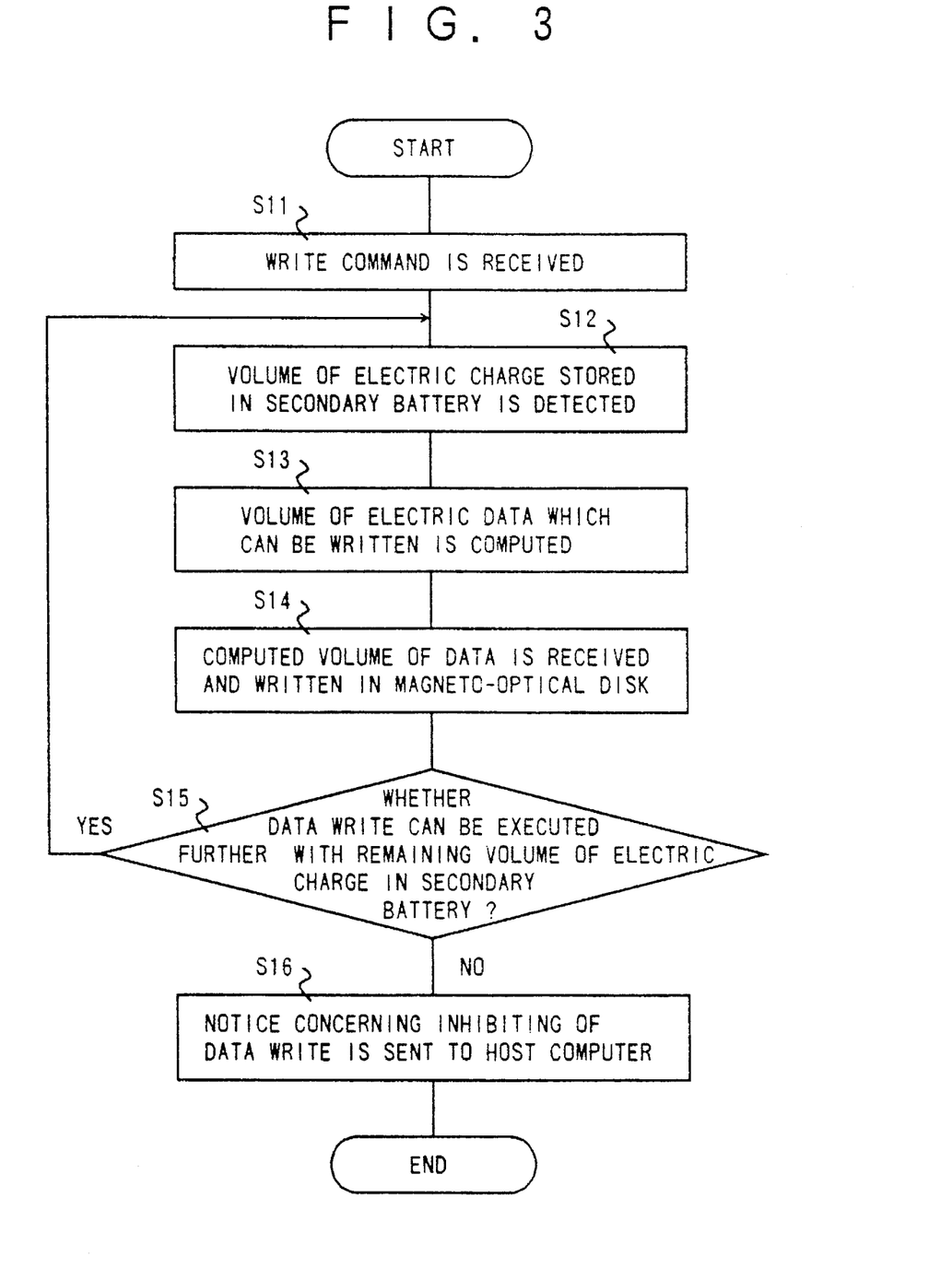
FIG. 3 is a flow chart showing a flow of main operations, when external power supply is disconnected, in a second embodiment of the present invention.

The operations are shown as a flow below. FIG. 3 is a flow chart illustrating a flow of main operations, when external power supply is disconnected, in the second embodiment of the present invention. In this figure, each of S11 to S16 indicates a step.

In step S11, a write command is received. In the next step S12, a volume of electric charge stored in the secondary battery is detected. Then the system control advances to step S13, where a volume of data which can be written according to the detected volume of electric charge is computed.

In step S14, the computed volume of data is received and written in a magneto-optical disk. In step S15, a determination is made as to whether data write can be executed further with a remaining volume of electric charge in the secondary battery or not.

If data write is possible, the system control returns to step S12, and then the same operations are repeated, and in step S15, if it is detected that further data write is impossible, system control advances to step S16.

In step S16, a notice concerning inhibition of data write is sent to the host computer, and the flow in FIG. 3 is terminated.

As described above, in the second embodiment, when the magneto-optical disk drive 5 receives a write command from the host computer 11, the controller 9 computes a volume of data which can be written only with power from a secondary battery according to a volume of electric charge at a point of time when detected by the electric charge volume detector 3, and receives the write data by the volume from the host computer 11 into the write buffer 10.

For this reason, as write data can be received and written with a smaller volume of electric charge in the secondary battery 4 as compared to that in the first embodiment, the time from start of supply of external power until data write into a magneto-optical disk drive is enabled is reduced.

Next description is made for the third embodiment. Also the hardware configuration is the same as that in the first embodiment shown in FIG. 1.

Concretely, in the second embodiment, when external power supply to a magneto-optical disk drive is stopped, a volume of data which can be written is computed according to a volume of electric charge in a second battery, and a determination as to whether new write data can be received from a host computer or not is made, and also considerations are paid to an operation for writing write data stored in a write buffer into an magneto-optical disk.

In contrast, this third embodiment is characterized in that a determination is made as to whether an operation for writing write data already stored in a write buffer into the magneto-optical disk can be started or not when external power supply is stopped.

In a circuit shown in FIG. 1, when external power supply from the external power supply unit 1 is stopped and power supply to the magneto-optical disk drive 5 is switched to the secondary battery 4, the controller 9 once stops power supply to the spindle motor 8, and, when the rotational speed of the spindle motor 8 has dropped to a predetermined level, resumes power supply to the spindle motor 8 so that the rotational speed of the spindle motor 8 is kept at a predetermined level, and then writes write data stored in the write buffer 10 into the magneto-optical disk 6 when the rotational speed of the spindle motor 8 is kept at the predetermined level.

Figure 4:
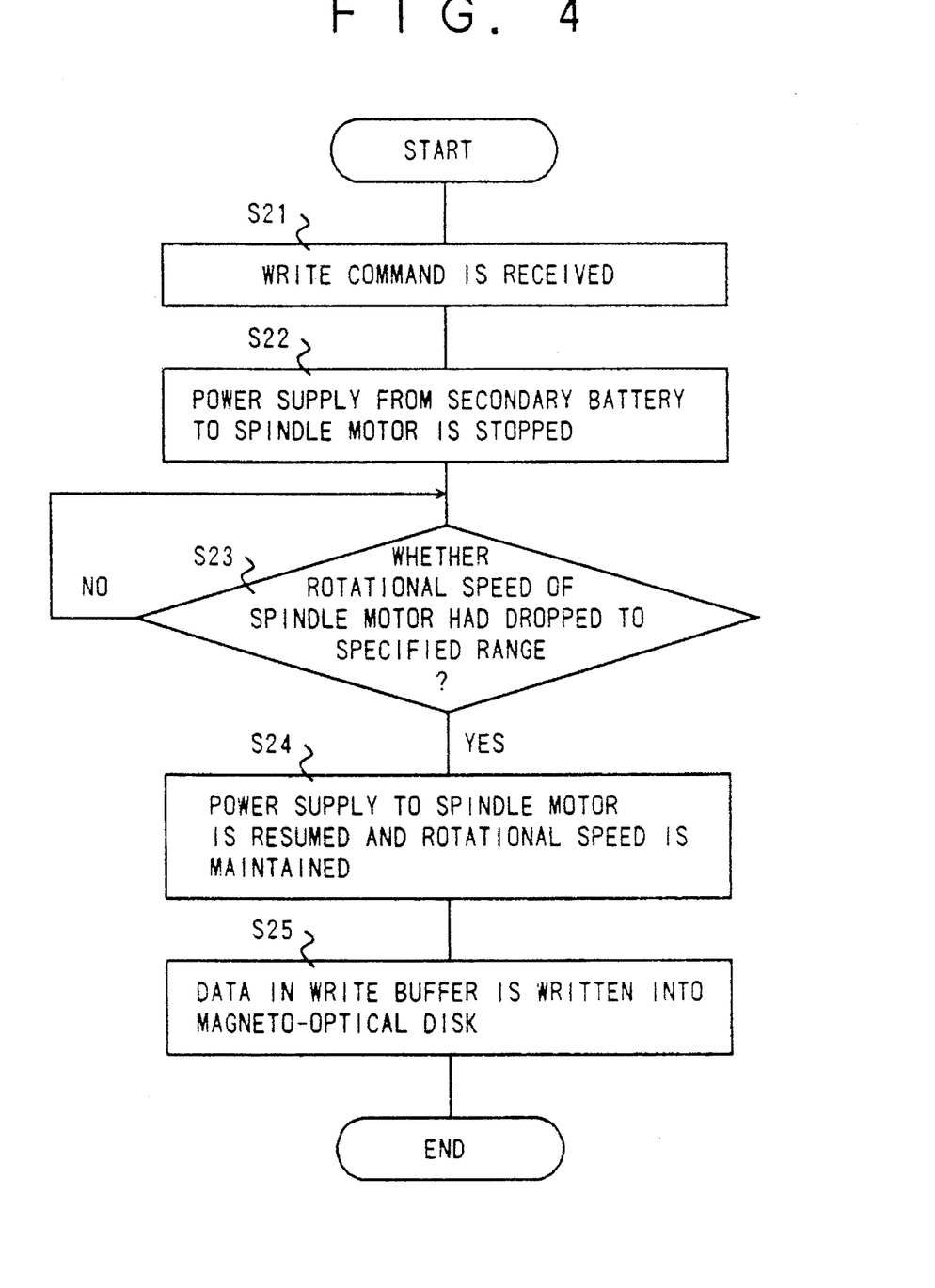
FIG. 4 is a flow chart showing main operations, when external power supply is disconnected, in a third embodiment of the present invention.

The operations above are shown as a flow below. FIG. 4 is a flow chart illustrating a flow of main operations, when external power supply is stopped, in the third embodiment of the present invention. In this figure, each of S21 to S25 indicates a step.

In step S21, a write command is received. In the next step S22, power supply from a secondary battery to a spindle motor is stopped. Then in step S23, a determination is made as to whether a rotational speed of the spindle motor had dropped to a specified range or not.

When it is determined that the rotational speed of the spindle motor has dropped to the specified range, system control advances to step S24, power supply to the spindle motor is resumed, and the rotational speed is maintained. In step S25, data in a write buffer is written into a magneto-optical disk, and a flow in FIG. 4 is finished.

By executing the control as described above, a time required for data write becomes slightly longer, but the power consumption can be held at a low level.

Any power consumption is proportional to square of the current, so that a required volume of electric charge can be reduced.

In addition, by reducing a required volume of electric charge as described above, a capacity of a secondary battery can be reduced, and also a time required after external power supply to the magneto-optical disk drive 5 is turned ON until a write operation is enabled can be shortened.

Furthermore by reducing the consumed current, a voltage in the secondary battery and a current capacity in hardware for current control can be reduced, so that the hardware cost can be held at a low level.

Next description is made for a fourth embodiment of the present invention.

This embodiment is similar to the third embodiment in the point that, when external power supply is stopped, a determination is made as to whether writing data already stored in a write buffer into a magneto-optical disk may be started or not depending on a rotational speed of a spindle motor.

However, this fourth embodiment is characterized in that an operating clock of the controller is switched to a clock lower than that in the normal operating mode when external power supply is stopped.

Figure 5:
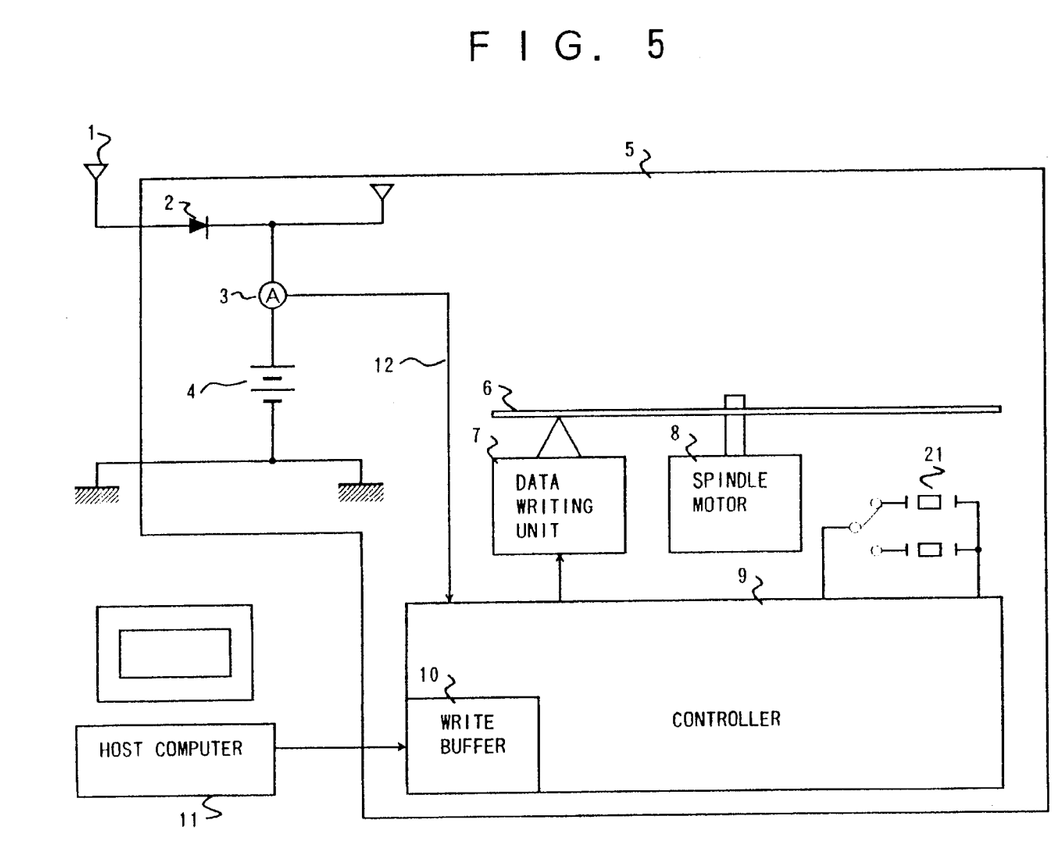
FIG. 5 is a functional block diagram showing the key configuration of the magneto-optical disk drive in a fourth embodiment of the present invention.

FIG. 5 is a functional block diagram illustrating key configuration of a magneto-optical disk drive according to the fourth embodiment of the present invention. The reference numerals in this figure are the same as those in FIG. 1, and the reference numeral 21 indicates a clock switch.

The circuit shown in FIG. 5 has the same configuration as that in FIG. 1 excluding the point that the clock switch 21 is added.

The operations are as described below. In the circuit in FIG. 5, when external power supply from the external power supply unit 1 is stopped and power supply to the magneto-optical disk drive 5 is switched to the secondary battery 4, the controller 9 once stops power supply to the spindle motor 8, and furthermore the controller 9 switches a clock to be used to a clock slower than that in the normal operating mode with the clock switch 21.

When a rotational speed of the spindle motor 8 drops to a predetermined level, a clock is returned to that in the normal operating mode by the clock switch 21, and power supply to the spindle motor 8 is resumed so that the rotational speed of the spindle motor 8 is kept at the predetermined level, and when the rotational speed of the spindle motor 8 is maintained at the predetermined level, write data stored in the write buffer 10 is written into the magneto-optical disk 6.

Figure 6:
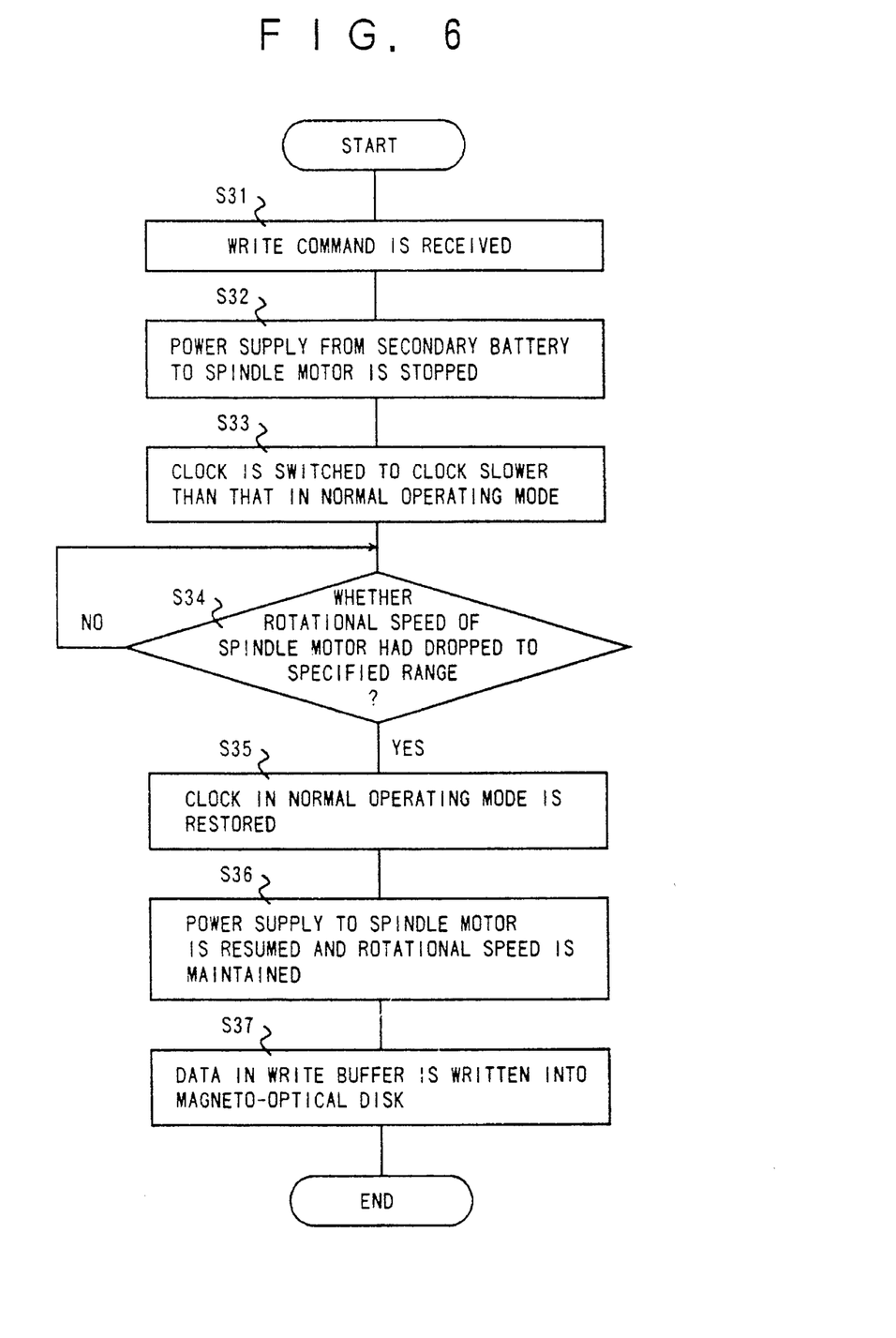
FIG. 6 is a flow chart showing a flow of main operations, when external power supply is disconnected, in the fourth embodiment of the present invention.

The operations above are described below as a flow. FIG. 6 is a flow chart illustrating a flow of main operations, when external power supply is disconnected, in the fourth embodiment of the present invention. In this figure, each of S31 to S37 indicates a step.

In step S31, a write command is received. In the next step S32, power supply from the secondary battery to the spindle motor is stopped. Then in step S33, a clock is switched to a clock slower than that in the normal operating mode with the clock switch.

In step S34, a determination is made as to whether a rotational speed of the spindle motor has dropped to a specified range or not. When it is determined that the rotational speed of the spindle motor has dropped to a specified range, system control goes to step S35, and a clock in the normal operating mode is restored by the clock switch.

In step S36, power supply to the spindle motor is resumed, and the rotational speed is maintained. In step S37, data in the write buffer is written into the magneto-optical disk, and a flow in FIG. 6 is finished.

After external power supply is disconnected until a rotational speed of the spindle motor drops to a specified range, the controller only waits until the rotational speed of the spindle motor drops to the specified range, so that power is consumed in waste by the controller. So during this period a clock used by the controller is switched to a clock slower than that in the normal operating mode to reduce power consumption.

Next description is made for a fifth embodiment of the present invention.

In this embodiment, the following problem is solved. That is, there is often dispersion in product quality among a plurality of products, including batteries. If any battery cell already out of its service life is used, power from other cells still available is used in waste by the cell already out of its service life and power is not effectively supplied. According to this embodiment of the present invention, a cell in which a volume of electric charge has not still reached a predetermined level is discriminated from a cell already out of its service life so that the cell is not used in waste.

Figure 7:
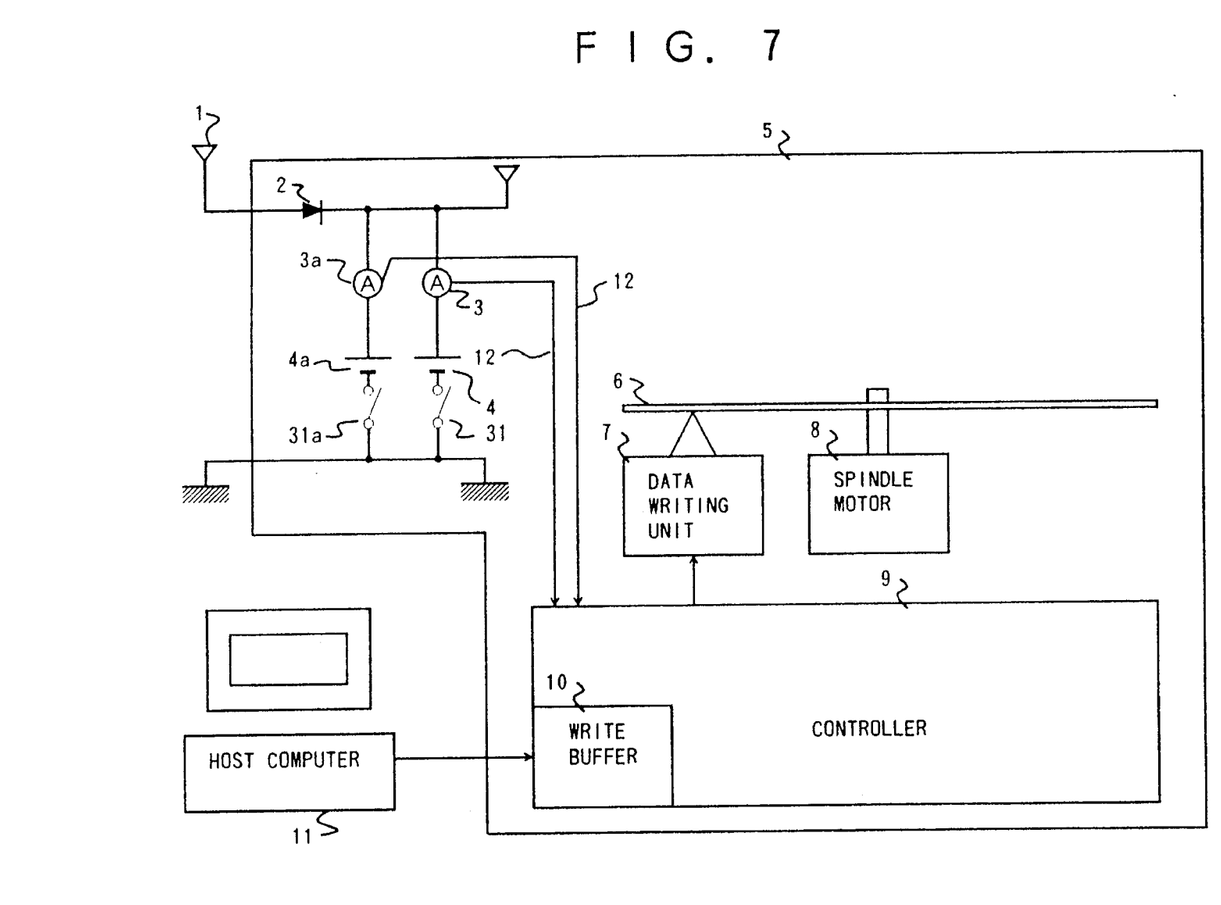
FIG. 7 is a functional block diagram showing the key configuration of a magneto-optical disk drive in a fifth embodiment of the present invention.

FIG. 7 is a functional block diagram illustrating key configuration of the fifth embodiment of the magneto-optical disk drive according to the present invention. The reference numerals in this figure are the same as those in FIG. 1, and in this figure designated at the reference numeral 3a is an electric charge volume detector, at 4a a secondary battery, at 31 and 31a a cell selector respectively.

The circuit in FIG. 7 is characterized in that said circuit comprises, in addition to the electric charge volume detector 3 and the secondary battery 4 provided in the circuit shown in FIG. 1, a cell selector 31, and has a new electric charge volume detector 3a, a secondary battery 4a, and a cell selector 31a each connected in parallel to a corresponding component above respectively.

Concretely the circuit comprises the magnetooptical disk drive 5, secondary batteries 4, 4a for charging power to be supplied to the magneto-optical disk drive 5 from outside, electric charge volume detector 3, 3a for detecting a volume of electric charge in the secondary batteries 4, 4a respectively, write buffer 10 for storing therein write data from the host computer 11, current switch 2 for switching a current so that a current to the magneto-optical disk drive 5 will be supplied from the secondary batteries 4, 4a, when external power supply is stopped, spindle motor 8 for rotating the magneto-optical disk 6, and the controller 9 for controlling the magneto-optical disk drive 5, and has a function to read out from or write data into the magneto-optical disk 6.

The operations are as described below. When power supply from the external power supply unit 1 to the magneto-optical disk drive 5 is started, charging from the external power supply unit 1 to the second batteries 4, 4a is started simultaneously, so that power is stored in the secondary batteries 4, 4a.

At this point of time, the cell selector 31, 31a are connected to each other. A volume of electric charge stored in the secondary batteries 4, 4a is detected by the electric charge volume detector 3, 3a respectively, and information on the detected electric charge volume is delivered through the electric charge volume delivering line 12 to the controller 9.

The controller 9 makes a determination as to whether a volume of electric charge in each cell has reached a predetermined level or not, and a cell in which a volume of electric charge has reached the predetermined level is kept in the connected state by the cell selector 31, 31a, while a cell in which a volume of electric charge has not reached a predetermined level is disconnected by the cell selector 31, 31a.

Figure 8:
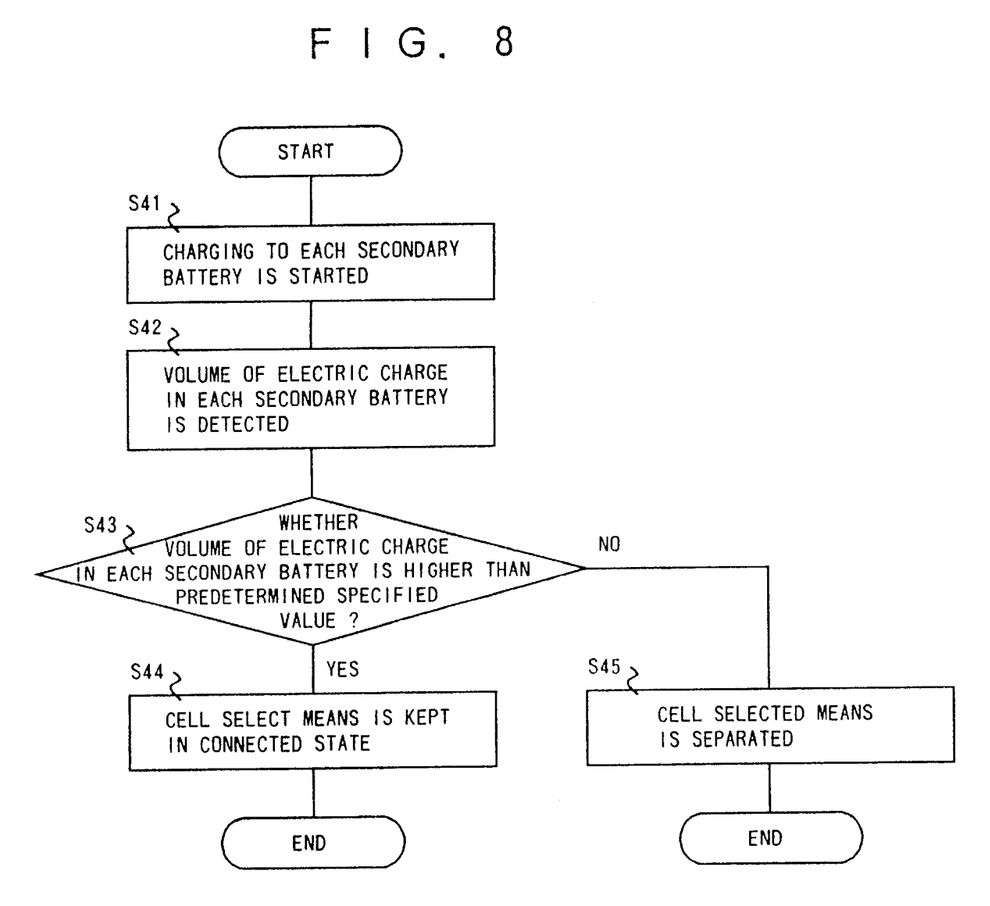
FIG. 8 is a flow chart showing a flow of main operations by a controller in the fifth embodiment of the present invention.

The operations above are described as a flow below. FIG. 8 is a flow chart illustrating a flow of main operations by a controller in the fifth embodiment of the present invention. In this figure, each of S41 to S45 indicates a step.

In step S41, charging to each secondary battery is started. In the next step S42, a volume of electric charge in each secondary battery is detected. In step S43, a determination is made as to whether a volume of electric charge in each secondary battery is higher than a predetermined specified value or not.

If the volume is more than the predetermined specified value, then in step S44, the cell selector is kept in the connected state, and a flow in FIG. 8 is finished.

If the volume is less than the predetermined specified value, then in step S45, the cell selector is separated, and a flow in FIG. 8 is finished.

With operations in the steps S41 to S45, a secondary battery in which a volume of electric charge is less than the specified value is regarded as already out of it service life, and its use is inhibited.

For this reason, a secondary battery still available is not affected by that already out of its service life, and works effectively.

Next description is made for a sixth embodiment of the present invention. Also the hardware configuration is the same as that of the first embodiment shown in FIG. 1.

In the third embodiment, when external power supply is stopped, a determination is made according to a rotational speed of a spindle motor as to writing write data already stored in a write buffer into a magneto-optical disk can be started or not.

In this sixth embodiment, when external power supply to a magneto-optical disk drive is stopped, power supply from a secondary battery to a spindle motor is once stopped, a rotational speed of the spindle motor when operated by a secondary battery is obtained from a volume of electric charge in the secondary battery, power supply from the secondary battery is resumed to keep the rotational speed when a rotational speed of the spindle motor has dropped to a predetermined level according to a volume of electric charge, and write data stored in a write buffer is written into a magneto-optical disk.

Figure 9:
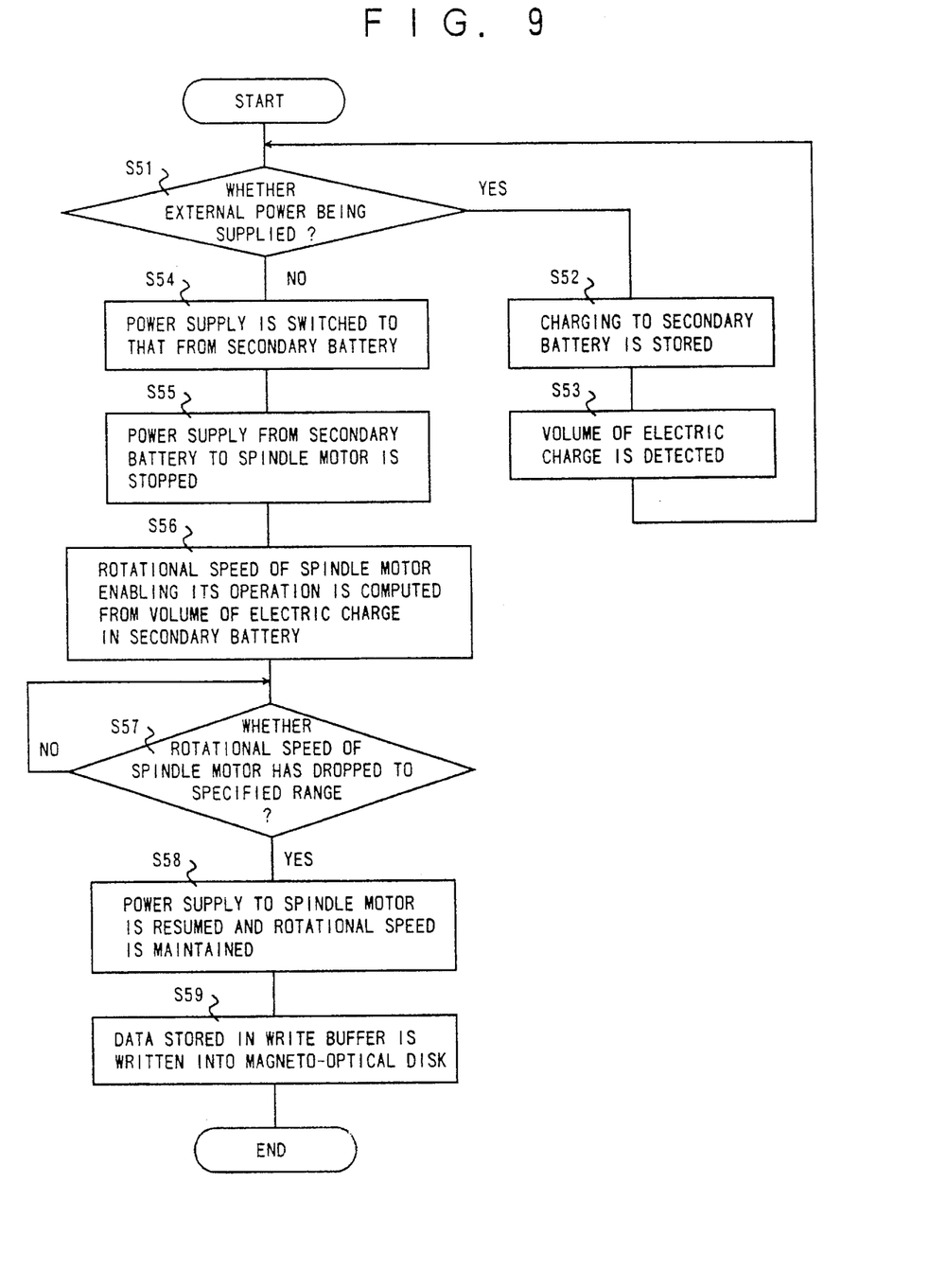
FIG. 9 is a flow chart showing a flow of main operations by the controller in a sixth embodiment of the present invention.

The operations above are described as a flow below. FIG. 9 is a flow chart illustrating a flow of main operations by the controller 9 in the sixth embodiment of the present invention. In this figure, each of S51 to S59 indicates a step.

In step S51, whether external power supply is being executed or not is checked. If external power is being supplied, then in step S52, charging to a secondary battery is started, and then in the next step S53, a volume of electric charge is detected.

If external power is not being supplied (when power is disconnected), in step S54, power supply is switched to the secondary battery. In the next step S55, power supply from the secondary battery to a spindle motor is stopped. In step S56, a rotational speed of a spindle motor enabling its operation is computed from a volume of electric charge in the secondary battery. Then in step S57, whether the rotational speed of the spindle motor has dropped to a specified range or not is checked.

When drop of the rotational speed of the spindle motor to a specified range is detected, then in step S58, power supply to the spindle motor is resumed, and the rotational speed is maintained. In step S59, data stored in a write buffer is written into a magneto-optical disk, and a flow in FIG. 9 is finished.

With the operations in the steps S51 to S59, when external power supply is disconnected, write data in a write buffer can safely and accurately be written into a magneto-optical disk with power charged in the secondary battery.

For this reason, with the sixth embodiment, even if a volume of electric charge in the secondary battery is smaller than a full charge volume in the initial state of the cell, write data can safely and accurately be written into a magneto-optical disk.

In the magneto-optical disk drive according to the invention, when a write command to be written into a magneto-optical disk is received from a host computer, whether a volume of electric charge in a secondary battery has reached a predetermined level or not is checked, and if it has not reached the predetermined level, a notice concerning inhibition of data write into a magneto-optical disk is sent to the host computer.

For this reason, even if power supply from an external power supply unit is disconnected, write data already written in a write buffer can safely and accurately be written into a magneto-optical disk.

In the magneto-optical disk drive according to the invention, a detector for detecting a volume of electric charge stored in a secondary battery when magneto-optical disk drive receives a write command from a host computer is provided, and based on a volume of electric charge detected by this electric charge volume detector, the controller computes a volume of data which can be written only with power from the secondary battery, and receives write data by the volume from the host computer into the write buffer.

For this reason, write data can be received and written with a smaller volume of electric charge in a secondary battery as compared to that required for the drive according to the invention, and also a time after external power supply is started until data write is enabled in a magneto-optical disk drive can be shortened.

In the magneto-optical disk drive according to the invention, when external power supply is stopped and power supply to a magneto-optical disk drive is switched to a secondary battery, the controller once stops power supply to a spindle motor, and resumes power supply to the spindle motor, when a rotational speed of the spindle motor has dropped to a predetermined level, so that the rotational speed is maintained at a predetermined level, and write data stored in the write buffer is written into a magneto-optical disk with the rotational speed of the spindle motor being maintained at a predetermined level.

For this reason, a time required for write operation slightly increases, but consumption of a current can be suppressed.

In this case, as consumption of a current is in proportion to square of a current, a required volume of electric charge can be reduced.

As a required volume of electric charge decreases, a capacity of a secondary battery can be reduced, and a time required after external power supply to a magneto-optical disk drive is started until write operation is enabled can be shortened, and furthermore in association of reduction of current consumption, a voltage in the secondary battery, a current capacity of hardware required for current control, and moreover cost of the hardware can also be reduced.

In the magneto-optical disk drive according to the invention, when external power supply is stopped and power supply to the magneto-optical disk drive is switched to a secondary battery, power supply to a spindle motor is once stopped by a controller, a clock to be used by the controller is switched by a clock switch to a clock slower than that in the normal operating mode, and when a rotational speed of the spindle motor has dropped to a predetermined level, the clock is returned by the clock switch to that in the normal operating mode, then power supply to the spindle motor is resumed, and write data stored in a write buffer is written into a magneto-optical disk with the rotational speed of the spindle motor being kept at the predetermined level.

For this reason, consumption of a current during deceleration of the spindle motor can be suppressed.

And when consumption of a current decreases, also a required volume of electric charge decreases, so that a capacity of a secondary battery can be reduced and a time required after external power supply to a magneto-optical disk drive is started until write operation is enabled can be shortened.

In the magneto-optical disk drive according to the invention, when external power supply to a magneto-optical disk is started, charging to a plurality of secondary batteries with external power supply is started, and electric charge is stored in the plurality of secondary batteries.

In this case, the cell selector is kept in the connected state. Then, a volume of electric charge in each cell is detected, and the information is delivered to the controller.

The controller makes a determination as to whether a volume of electric charge in each cell has reached a predetermined level or not, and a cell selector for a cell in which a volume of electric charge stored therein has reached the predetermined level is kept in the connected state, while a cell selector for a cell in which a volume of electric charge stored therein has not reached the predetermined level is disconnected.

For this reason, the problem of waste of power supply from a cell still available by a cell already out of its service life due to dispersion of product quality among a plurality of cells can be evaded.

In the magneto-optical disk drive according to the invention, when external power supply is disconnected and power supply is switched to a secondary battery, the controller once stops power supply to a spindle motor, computes a rotational speed enabling operation of the spindle motor from a volume of electric charge in a secondary battery, resumes power supply to the spindle motor when a rotational speed of the spindle motor has dropped to a specified range so that the rotational speed is kept in a predetermined range, and writes data stored in a write buffer into a magneto-optical disk.

For this reason, even when a volume of electric charge in the secondary battery is smaller than the full charge in the initial state of its use, write data can safely and accurately be written into a magneto-optical disk.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A magneto-optical disk drive apparatus having a function for reading or writing data into a magneto-optical disk comprising:

a magneto-optical disk drive;

a secondary battery consisting of a plurality of cells each storing power to be supplied to said magneto-optical disk drive from outside;

an electric charge volume detector for detecting a volume of electric charge stored in said secondary battery;

a write buffer for storing therein write data from a host computer;

a current switch for switching a current to said magneto-optical disk drive to that from said secondary battery when power supply is stopped;

a spindle motor for driving said magneto-optical disk; and a controller for controlling said magneto-optical disk drive, wherein said writing write data into said magneto-optical disk is inhibited when a volume of electric charge stored in said secondary battery has not reached a predetermined level.

2. A magneto-optical disk drive apparatus according to claim 1, further comprising a write data volume controller for limiting a volume of write data to be stored in said write buffer according to a volume of electric charge stored in said secondary battery.

3. A magneto-optical disk drive apparatus according to claim 1, further comprising a rotational speed controller for stopping power supply to said spindle motor once when external power supply is stopped, and power supply to said magneto-optical disk drive is switched to a secondary battery and maintaining the rotational speed of said spindle motor at a predetermined level when the rotational speed of said spindle motor has dropped to the predetermined level, wherein said write data stored in said write buffer writes into a magneto-optical disk when the rotational speed of said spindle motor is kept at the predetermined level.

4. A magneto-optical disk drive apparatus according to claim 3 further comprising:

a first clock switch for switching an operating clock of said controller for a magneto-optical disk drive from a normal clock to a slower clock when power supply to said spindle motor is once stopped; and a second clock switch for switching an operating clock of said controller to the normal clock when the rotational speed of said spindle motor has dropped to a predetermined level and the rotational speed of said spindle motor is kept at the predetermined level.

5. A magneto-optical disk drive apparatus according to claim 1 further comprising a selector for selecting a cell in which a volume of electric charge has reached a predetermined level with said electric charge volume detector for detecting a volume of electric charge in each cell constituting said secondary battery consisting of a plurality of cells and supplying power to said magneto-optical disk drive.

6. A magneto-optical disk drive apparatus according to claim 1, further comprising a rotational speed controller for stopping power supply to said spindle motor once when external power supply is stopped, and power supply to said magneto-optical disk drive is switched to said secondary battery and maintaining a rotational speed of said spindle motor at a predetermined level when the rotational speed of said spindle motor has dropped according to a volume of electric charge stored in said secondary battery to said predetermined level, wherein said write data stored in said write buffer is written into said magneto-optical disk when the rotational speed of said spindle motor is kept at said predetermined level.

7. A magneto-optical disk driving method comprising the steps of:

making a determination as to whether an external power is being supplied;

charging a secondary battery when the external power is being supplied;

detecting a volume of electric charge stored in said secondary battery;

switching power supply from said secondary battery when the external power is not being supplied;

making a determination as to whether a write command has been received;

making a determination as to whether a volume of electric charge stored in said secondary battery is more than a specified value;

writing a write data in a write buffer into said magneto-optical disk when said volume is more than said specified value; and outputting a notice to a host computer inhibiting data write when said detected volume of electric charge is not more than said specified value.

8. A magneto-optical disk driving method comprising the steps of:

receiving a write command;

detecting a volume of electric charge stored in a secondary battery;

computing a volume of data which can be written according to said detected volume of electric charge;

receiving said computed volume of data and writing it in said magneto-optical disk;

making a determination as to whether data write can be executed further with a remaining volume of electric charge stored in said secondary battery; and outputting a notice to a host computer inhibiting data write when it is determined that further data write can not be executed with the remaining volume of electric charge stored in said secondary battery.

9. A magneto-optical disk driving method comprising the steps of:

receiving a write command;

stopping power supply from a secondary battery to a spindle motor;

making a determination as to whether a rotational speed of said spindle motor has dropped to a specified range;

resuming power supply to said spindle motor and maintaining said rotational speed; and writing data in a write buffer into said magneto-optical disk.

10. A magneto-optical disk driving method comprising the steps of:

receiving a write command;

stopping power supply from a secondary battery to a spindle motor;

switching a clock to a clock slower than that in the normal operating mode;

making a determination as to whether a rotational speed of said spindle motor has dropped to a specified range;

restoring a clock in said normal operating mode;

resuming power supply to said spindle motor and maintaining said rotational speed; and writing data in a write buffer into said magneto-optical disk.

11. A magneto-optical disk driving method comprising the steps of:

charging each of a plurality of secondary batteries;

detecting a volume of electric charge in each secondary battery;

making a determination as to whether a volume of electric charge in each secondary battery is higher than a predetermined specified value;

keeping a cell selector in a connected state when said volume is more than said predetermined specified value; and separating a cell selector when said volume is less than said predetermined specified value.

12. A magneto-optical disk driving method comprising the steps of:

making a determination as to whether an external power is being supplied;

charging a secondary battery when the external power is being supplied;

detecting a volume of electric charge stored in the secondary battery;

switching power supply to that from said secondary battery when the external power is not being supplied;

stopping power supply from said secondary battery to a spindle motor;

computing a rotational speed of said spindle motor enabling its operation from a volume of electric charge in said secondary battery;

making a determination as to whether the rotational speed of said spindle motor has dropped to a specified range;

resuming power supply to said spindle motor and maintaining said rotational speed; and writing data in a write buffer into said magneto-optical disk.

* * * * *